(12) United States Patent
Bennett et al.

(10) Patent No.: US 8,479,009 B2
(45) Date of Patent: Jul. 2, 2013

(54) WEARABLE TIME-BRACKETED VIDEO AUTHENTICATION

(75) Inventors: Charles Bennett, Croton-on-Hudson, NY (US); Mavis Donkor, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 12/884,816

(22) Filed: Sep. 17, 2010

(65) Prior Publication Data
US 2012/0072733 A1    Mar. 22, 2012

(51) Int. Cl.
*H04L 9/32* (2006.01)

(52) U.S. Cl.
USPC ............. 713/180; 380/200; 725/31; 348/335; 348/370

(58) Field of Classification Search
USPC ..................... 713/180; 725/31; 380/200, 210, 380/227
See application file for complete search history.

(56) References Cited

U.S. PATENT DOCUMENTS

| | | | | |
|---|---|---|---|---|
| 5,463,538 A * | 10/1995 | Womack | | 362/106 |
| 5,764,769 A * | 6/1998 | Bennett et al. | | 713/176 |
| 5,966,446 A | 10/1999 | Davis | | |
| 6,296,943 B1 * | 10/2001 | Watanabe et al. | | 428/447 |
| 6,614,408 B1 * | 9/2003 | Mann | | 345/8 |
| 6,704,044 B1 * | 3/2004 | Foster et al. | | 348/157 |
| 6,851,051 B1 | 2/2005 | Bolle et al. | | |
| 6,853,737 B2 * | 2/2005 | Watanabe | | 382/100 |
| 7,197,143 B2 | 3/2007 | Duerr et al. | | |
| 7,477,740 B2 | 1/2009 | Bennett | | |
| 2002/0101568 A1 * | 8/2002 | Eberl et al. | | 351/211 |
| 2003/0231769 A1 | 12/2003 | Bolle et al. | | |
| 2005/0172229 A1 * | 8/2005 | Reno et al. | | 715/700 |
| 2007/0098172 A1 * | 5/2007 | Levy et al. | | 380/247 |
| 2008/0204589 A1 * | 8/2008 | Chang | | 348/373 |
| 2009/0180283 A1 * | 7/2009 | Chu | | 362/259 |
| 2009/0252345 A1 * | 10/2009 | Le et al. | | 381/74 |
| 2010/0070758 A1 * | 3/2010 | Low et al. | | 713/155 |
| 2010/0115605 A1 * | 5/2010 | Beattie et al. | | 726/15 |
| 2010/0153857 A1 * | 6/2010 | Sanchez et al. | | 715/756 |
| 2010/0198712 A1 * | 8/2010 | Benisti et al. | | 705/34 |
| 2010/0217789 A1 * | 8/2010 | Saitoh et al. | | 708/255 |
| 2010/0314861 A1 * | 12/2010 | Amidror et al. | | 283/85 |
| 2012/0249797 A1 * | 10/2012 | Haddick et al. | | 348/158 |

OTHER PUBLICATIONS

Wikipedia, Audrino, p. 3 (Dec. 18, 2008), http://web.archive.org/web/20081218153941/http://en.wikipedia.org/wiki/Arduino[Jun. 13, 2012.*

(Continued)

*Primary Examiner* — April Shan
*Assistant Examiner* — Jason Plotkin
(74) *Attorney, Agent, or Firm* — Cantor Colburn LLP; Vazken Alexanian

(57) ABSTRACT

A wearable video recording system with time-bracketed authentication is provided and includes a article, including a spine, wearable by a user, a recording device, supported on the spine, to generate a recording of a scene, an affecter subsystem, supported on the spine, to influence the scene being recorded with unpredictable data and an untrusted controller coupled to the recording device and the affecter subsystem, the untrusted controller being receptive of the unpredictable data, which the untrusted controller communicates to the affecter subsystem, and being configured to transmit at least hashed digests of the recording to one or more repositories.

18 Claims, 5 Drawing Sheets

OTHER PUBLICATIONS

Wikipedia, Audrino, p. 3 (Dec. 18, 2008), http://web.archive.org/web/20081218153941/http://en.wikipedia.org/wiki/Arduino(Jun. 13, 2012).*

Steve Mann et al., Eyetap Technology for Wireless Electronic News Gathering, ACM SIGMOBILE Mobile Computing and Communication Review, vol. 3, No. 4, pp. 19-26, Oct. 1999.*

Bennett, Charles H., "Improvements to Time Bracketed Authentication," arXiv:cs/0308026, Aug. 18, 2003, http://arxiv.org/ftp/cs/papers/0308/0308026.pdf.

Bennett, Charles H., et al., "Trust Enhancement by Multiple Random Beacons," arXiv:cs/0201003, Feb. 1, 2008, http://arxiv.org/PS_cache/cs/pdf/0201/0201003v1.pdf.

Lin, Ching-Yung, et al., "Issues and Solutions for Authenticating MPEG Video," Proc. SPIE, vol. 3657, 1999, pp. 54-65.

Lee, Hui Huang, et al., "Pervasive Random Beacon in the Internet for Covert Coordination," Lecture Notes in Computer Science, Information Hiding, vol. 3727, 2005, pp. 53-61.

* cited by examiner

WEARABLE TIME-BRACKETED VIDEO AUTHENTICATION

BACKGROUND

The present invention relates to a wearable time-bracketed video authentication system.

Recorded evidence, such as videotapes of crime scenes, police interviews, and actions performed in fulfillment of a contract, statute, ordinance or treaty, are ordinarily authenticated by the testimony of witnesses present when the recording was made, supplemented by an unbroken chain of custody between the time the recording was made and the time it is used in evidence. If the chain of custody were broken, for example if the recording were borrowed for a few days by an unscrupulous person, modern digital signal manipulation techniques would make it possible to falsify the evidence, for example by altering an internal time stamp or by adding or removing scenes, objects, sounds, data or the like.

This problem has been dealt with by a technique known as time stamping. For example, U.S. Pat. No. Re. 34,954 to Haber, et al., discloses a time-stamping technique in which a digital document is hashed using a one-way hash function to form a hash digest. The digest (a binary number) is sent to a trusted certification agency, which assigns a time stamp and uses a public key cryptosystem to encrypt the combination of the digest and time stamp. By decrypting this combination at a later time, using the agency's public key, it is provable that the agency in fact combined the hash digest with the time stamp. Since the agency is trusted, it is inferred that the hash digest was submitted to the agency at the time corresponding to the time stamp. By the nature of one way hash functions, no other document can plausibly have the same hash digest value.

The Haber method authenticates the fact that a given digital document was submitted to the agency at a certain time. It says nothing about the relationship between the document and a set of circumstances in the physical world that the document may purport to faithfully represent. For example, a scene could be staged and videotaped at time A, authenticated with a later time stamp B, and falsely claimed to be a representation of events that occurred at any desired time prior to time B. Alternatively, the videotape could be assembled from portions made at different times (all prior to time B). Thus, the Haber method provides no way to bracket the time of creation of the video since only a latest time of creation (i.e., time B) is authenticated.

The importance of knowing that a certain event did not take place before its purported time is illustrated by a form of insurance fraud. A motorist involved in an accident in which he was not at fault might take a picture of his damaged car and send it to his insurance company, concealing the fact that most of the damage occurred in an earlier, unreported accident in which he was at fault.

Another approach to authenticating recordings is disclosed in U.S. Pat. No. 4,922,339 to Stout, et al., which describes a system for visual surveillance and documentation which comprises one or more cameras to visually record an event and a transducer that derives (non-visual) information about the event. The visual signal and the information signal are integrated to form a third signal that is recorded or displayed. This is asserted to be done in such a way that neither the visual nor the information portion can be altered independently of the other portion. An example shows a truck being weighed and the weight measurement being combined with a visual image of the truck. Time stamping is optional.

While Stout claims to provide an unalterable record linking a video image to some measured information about the physical world, possibly including a time stamp, Stout provides no means of ensuring unalterability. Instead, Stout relies on the combining of two signals to form one signal using a commercially available device but does not consider the possibility that the combined signal could be decomposed and a new combined signal reconstructed in which one of the components has been altered. Even if a time stamp is used, no authentication of the time stamp is provided by Stout. Time stamp authentication is of course known in the art as evidenced by Haber but even if applied to the Stout system, such authentication only provides a latest time at which the recording could have been made.

SUMMARY

According to an embodiment of the present invention, a wearable video recording system with time-bracketed authentication is provided and includes an article, including a spine, wearable by a user, a recording device, supported on the spine, to generate a recording of a scene, an affecter subsystem, supported on the spine, to influence the scene being recorded with unpredictable data and an untrusted controller coupled to the recording device and the affecter subsystem, the untrusted controller being receptive of the unpredictable data, which the untrusted controller communicates to the affecter subsystem, and being configured to transmit at least hashed digests of the recording to one or more repositories.

According to another embodiment of the invention, a wearable video recording system with time-bracketed authentication is provided and includes an article, including a spine, wearable by a user, a recording device, supported on the spine, to generate a recording of a scene, an affecter subsystem, supported on the spine, to influence the scene being recorded with unpredictable data and an untrusted controller coupled to the recording device and the affecter subsystem, the untrusted controller being receptive of the unpredictable data from a single trusted source or one or more somewhat-trusted sources, which the untrusted controller communicates to the affecter subsystem, and configured to transmit at least hashed digests of the recording to a single trusted repository or one or more somewhat-trusted repositories.

According to yet another embodiment of the invention, a method of managing recorded information is provided and includes recording, at an untrusted controller, a scene influenced by the recorder with unpredictable data received from a single trusted source or one or more somewhat trusted sources, transmitting at least hashed digests of the recording from the untrusted controller to a single trusted repository or one or more somewhat trusted repositories, freely publicizing hardware design and source code for the single trusted source, the one or more somewhat trusted sources, the single trusted repository and/or the one or more somewhat trusted repositories and providing restricted access to client subsystem hardware and software information relating to the untrusted controller.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to principles of time-bracketed authentication as described in U.S. Pat. No. 5,764,769, which is incorporated herein by reference, untrusted recording equipment authenticates its record without need of trusting the equipment or operator by real-time two-way communication with remote trusted servers. The untrusted recording equipment periodically receives unpredictable signals from one or more trusted external servers, uses these signals to nontrivially affect the scene being filmed and sends hashed digests of the ongoing recording to one or more other trusted external servers, which keep the data for subsequent verification of the untrusted recording itself.

Figure 1:
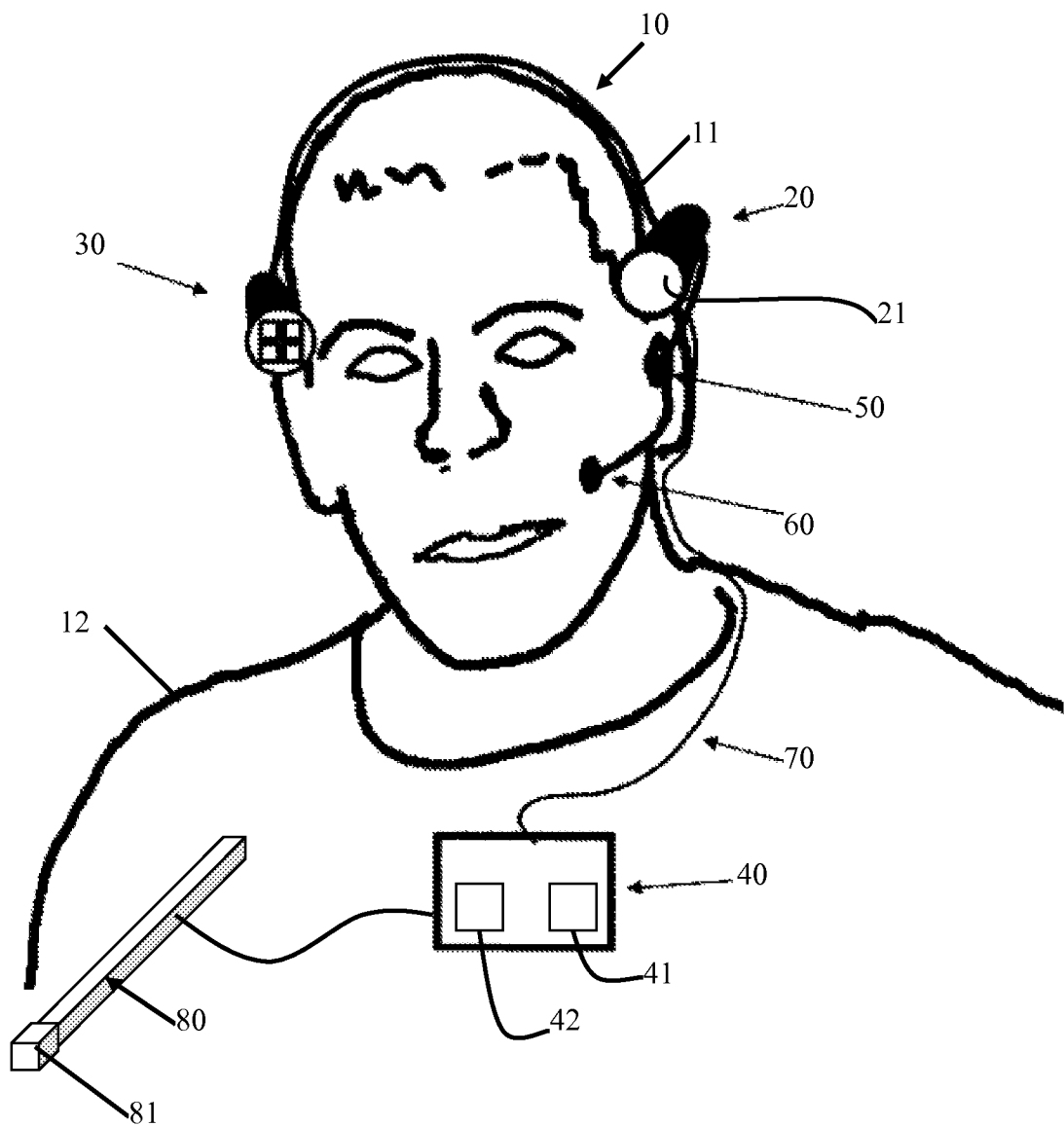
FIG. 1 is an illustration of a wearable video recording system.

With reference now to FIG. 1, a wearable video recording system with time-bracketed authentication includes an article 10, including a spine 11, which is wearable by a user 12 or by multiple users 12, and a recording device 20 to generate a recording of a scene. The spine 11 of the article 10 may include a headband or headgear, as shown, to be worn on the user's head or similar device wearable on another suitable portion of the user's body so that the recording device 20 can record whatever the user sees. In accordance with various aspects of the invention, the spine 11 may be worn above or underneath the user's 12 cover (i.e., hat or cap), such that it is visible or concealed, as circumstance require or permit.

The recording device 20 may include a wearable digital video camera, as an example, and may be singular or plural, or hand-held and may further include an optical filter 21. The recording system may also include one or more microphones 60. The wearable video recording system further includes an affecter subsystem 30, 50, an untrusted controller 40, such as a client computer, and a power/data cable 70 by which the untrusted controller 40 communicates with at least the recording device 20 and the affecter subsystem 30, 50.

The affecter subsystem 30, 50 is configured to influence the scene being recorded with unpredictable data. Unpredictable data refers to data which is unpredictable before it is written and a matter of public record afterwards. Thus, unpredictable data could refer to, for example, broadcasts of disparate television stations, stock quotes taken from exchanges around the world so that one is always open and other similar types of data.

The affecter subsystem includes one or more affecter illuminators 30 mounted on the user's head, at a different location from the recording device 20, or elsewhere on the body of the user 12, so as to provide parallax sight onto the scene being videoed. The intensity of the effect provided by the affecter illuminators 30 is automatically modulated by, for example, trusted source signals. In accordance with embodiments, the illuminator(s) 30 include visible or near-infrared lasers and/or LEDs.

The affecter subsystem may also include an earphone 50 by which commands generated in accordance with trusted source signals can be presented to the user 12 and can instruct the user 12 to perform specific actions with visible and/or audible consequences in the scene being recorded. These commands may include commands that the user 12 hold his/her hand or other body part or some other object in, or to throw some object into, the field of view of the recording device 20, where its characteristic appearance, motion and/or sounds generated will be incorporated into the recording. The commands may further include commands to manipulate the recording device 20 or to change the viewing angle or line of sight of the user 12 and the recording device 20 together.

The commands may be presented to the user 12 as pre-recorded or text-to-speech generated audio messages that are, optionally, mixed with other audio communications the operator is receiving (for example from a dispatcher) and/or may be presented as non-verbal signals, such as vibrations or visual cues.

The wearable video recording system may further include a handheld laser pointer (visible or infrared (IR)) 80. Here, the commands further include commands for the user 12 to scan the laser pointer 80 over the scene being videoed in a specified pattern, such as horizontally left-right-left, or to draw a specified figure, such as a number or letter, on the scene with the laser pointer, e.g. M, W, X, O, 8, A, or V. For figures requiring multiple strokes, like A or X, the user 12 would turn the laser pointer 80 on for the strokes and off for the connecting motions between strokes. The visibility of the light of the laser pointer 80 in the recorded video may be enhanced by an optical filter in the optical path of the recording device 20, which may be a narrow bandpass filter including the laser pointer 80 wavelength or a constant or variable neutral density filter with a narrow band of greater transparency including the laser pointer 80 wavelength.

In accordance with embodiments, the laser pointer 80, whether it emits visible light or IR, may be fitted with diffraction screens, lenses or optics 81 for spreading the collimated light beam into a pattern such as a line, circle, cross, or array of dots, so as to permit a higher total power to be emitted while keeping the power emitted in any one direction within standard laser safety limits.

The untrusted controller 40 includes an untrusted client computer in that data generated by the untrusted controller 40 needs to be authenticated and verified. As shown in FIG. 1, the untrusted controller 40 resides in a unit worn on, for example, the user's torso and includes batteries 41 to power the equipment. A link between the untrusted controller 40 and trusted servers, sources and/or repositories is mediated via a virtual private network (VPN) connection over a cellular telecommunications service, via an intermediate base station, e.g., a WiFi router, using a VPN or some other similar system or network.

Figure 2:
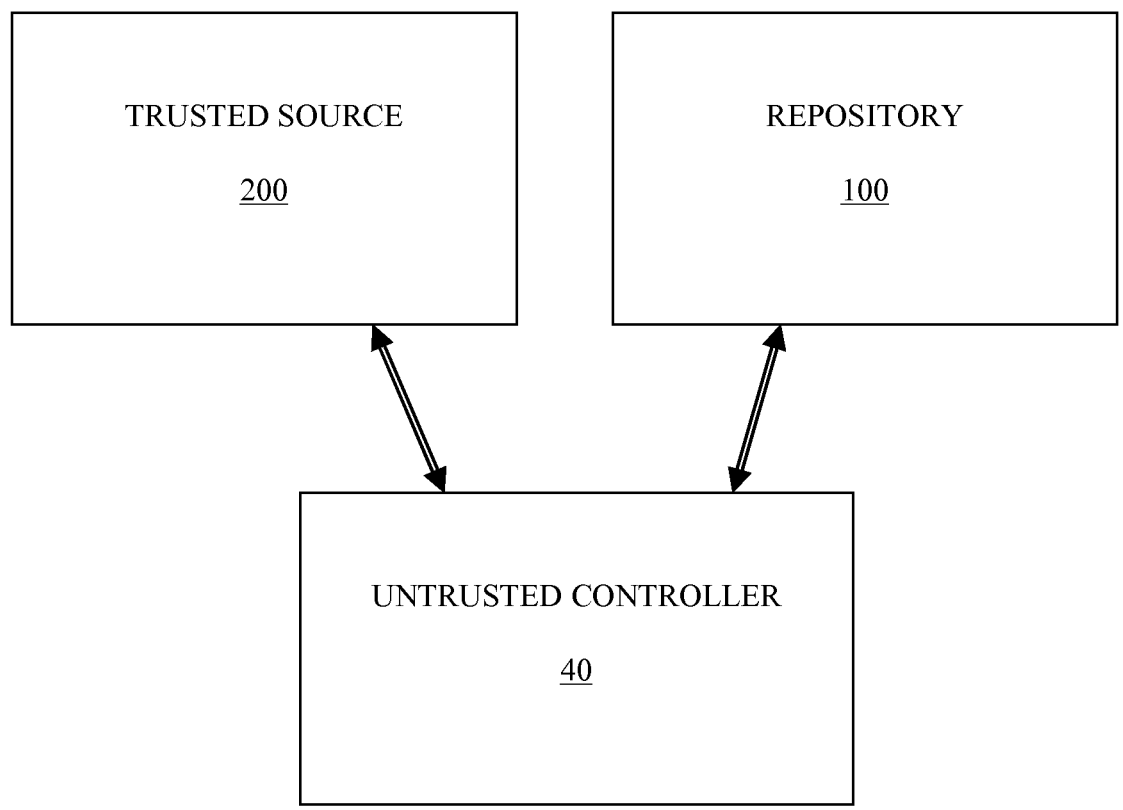
FIG. 2 is a schematic diagram of a network according to embodiments of the invention.
Figure 3:
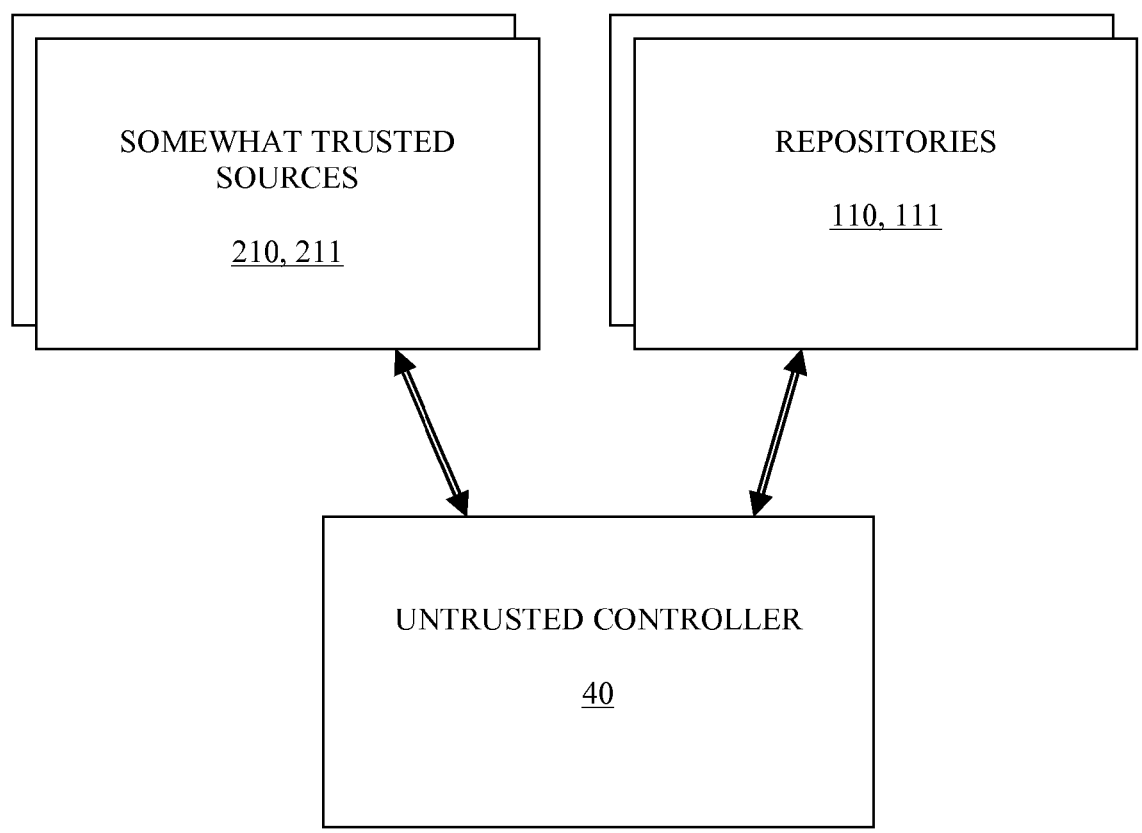
FIG. 3 is a schematic diagram of a network according to alternative embodiments of the invention.

With reference to FIGS. 2 and 3, the untrusted controller 40 is thereby receptive of the unpredictable data, which the untrusted controller 40 communicates via the power/data cable 70 to the affecter subsystem 30, 50 and is configured to transmit at least hashed digests of the recording produced by the recording device 20 to a repository 100 (see FIG. 2) or one or more repositories 110, 111 (see FIG. 3) in a manner similar to the disclosure of U.S. Pat. No. 7,477,740. That is, the untrusted controller 40 receives trusted real time signals from a single trusted challenge source 200 (see FIG. 2) or from two or more external somewhat-trusted sources 210, 211 (see FIG. 3). The untrusted controller 40 uses this data, via the affecter subsystem 30, 50, to influence the scene being videoed, generates and stores locally the recording produced by the recording device 20 and periodically transmits at least the hashed digests of the ongoing recording and other information to one or more somewhat-trusted repositories (see below).

The sources 210, 211 are one or more geographically and administratively separate somewhat-trusted servers. Each generates and temporarily secretly stores a sequence of random data values, then makes these values public by broadcasting them or serving them to any client connected to any of the sources 210, 211. In more detail, at each of a sequence of discrete times each of the sources 210, 211 serves or broadcasts a message (hereinafter called a "source signal") including one or more of identifying information, such as the source's name and IP address, the time, according to a local clock that each of the sources 210, 211 maintains in approximate synchrony (e.g. <1 second) to a global time standard such as UT1 by standard procedures such as Internet synchronization or synchronizing to GPS satellites and authenticating information, such as a digital signature of the source signal by the source's private key.

The source signal may further include a random data string of at least a few dozen bits which each of the sources 210, 211 has generated some time earlier by a physically random process and has stored secretly for at least a time that is large compared to expected propagation delays (e.g. several seconds). In addition, the source signal may include a commitment to a random data string which each of the sources 210, 211 has generated more recently and is still storing secretly, but will emit in the future. A string c is called a "commitment" to a string r if c is not easily computable without knowing r, c is easily computable knowing r and r is not easily computable from c. A commitment can be provided by a cryptographically strong hash function h such as SHA-2. Thus, c=h(r) would be a commitment to r because h is easy to compute but presumed hard to invert.

The repositories 110 and 111 are one or more geographically and administratively separate trusted servers, which may be co-located with the sources 210, 211, so that a single server is able to perform the functions of one source and one repository (however each source must be geographically and/or administratively separate from every other source, and each repository must be geographically and/or administratively separate from every other repository). Like the sources 210, 211, each repository 110, 111 maintains a local clock in approximate synchrony with a global time standard. Each repository 110, 111 undertakes to receive and store repository messages sent to it by one or more clients, such as untrusted controller 40, marks the repository message with the time it was received, and optionally returns to the client a digitally signed receipt for it. Each repository 110, 111 further undertakes to authenticate or furnish this data again when requested by a verifier program 300 (see FIG. 4).

The sources 210, 211 and the repositories 110, 111 may be hosted on the Internet and communication between them and the untrusted controller 40 takes place via the Internet or systems or networks other than the Internet. In the case of the sources 210, 211, since only one-way communication is required, the sources 210, 211 could send their signals via automated radio broadcast, similar to weather and time signal broadcasts.

In an alternative embodiment, the role of the sources 210, 211 and/or the repositories 110, 111 is performed by a trusted hardware subsystem connected to the untrusted controller 40. This trusted hardware subsystem could be used, for example, to provide time-bracketed authentication for a recording during periods of loss of connectivity to the external trusted servers. The trusted hardware subsystem would therefore include a tamper-resistant module 42 (see FIG. 1), the module 42 including a clock, a physically random or pseudorandom source for generating the source signals, a quantity of secure digital storage for storing the source signals, session information and digests and an interface for exchanging data with the untrusted controller 40 and for servicing subsequent requests from the verifier program 300 for archived source and repository data. Alternatively, the trusted hardware subsystem could be designed to retain the archived data only temporarily, uploading it to trusted external servers as soon as communication with these servers becomes available.

The untrusted controller 40 is configured to establish connections with several sources 210, 211 and several repositories 110, 111. As such, at regular time intervals during a recording session, the untrusted controller 40 receives source signals from each of the sources 210, 211 to which it is connected, verifies consistency of each received source signal's random data string $r_i$ with a commitment $c_i$ which was received earlier from a same source, derives from the several random data strings it has received and verified an affecter string a, which will include random and unpredictable data if at least one of the sources 210, 211 was random and unpredictable. This may be done, for example, by applying a cryptographically strong hash function h to the r values received from the several sources 210, 211, e.g., $a=h(r_1, r_2, r_3)$, where $r_1, r_2, r_3$ are random data strings received from three different sources 210, 211. The consistency of each $r_i$ with a previously received commitment prevents a dishonest source 210, 211 from biasing a by adapting its r value to the r values of other honest sources 210, 211.

The untrusted controller 40 then uses the affecter string to drive the affecter subsystem 30 and 50 to thereby cause the affecter subsystem to influence the scene being recorded in a way that is not quickly or automatically falsifiable. Periodically during the recording session, the untrusted controller 40 sends to each of the several repositories 110, 111 it has connected to a separate copy of a repository message. This repository message includes identifying information, such as the untrusted controller's 40 name and IP address, all the source signals received over the last time interval since the preceding repository message, including identifying information of the sources 210, 211, times of broadcasts, random data strings and commitments and all digests of the recording, including influences due to the affecter subsystem 30, 50, which were generated since the last repository message.

The untrusted controller 40 may then receive a response repository message from each repository 100, 110, 111 including a receipt for the repository message that is digitally signed by the repository 100 that received it. In addition, the untrusted controller 40 may locally store auxiliary session information, including session identifying information, all the repository messages sent and optional receipts, along with the typically much larger volume of data including the recording.

Figure 4:
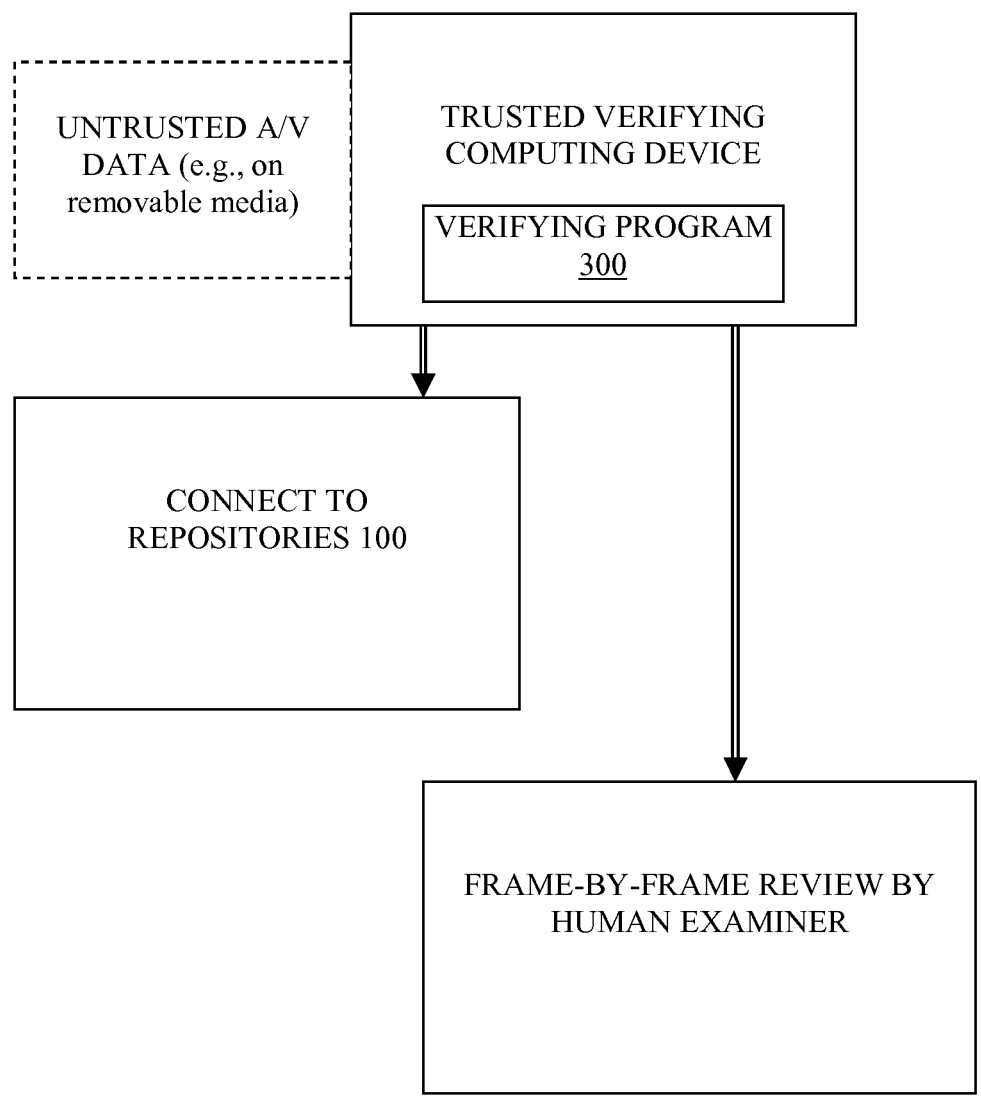
FIG. 4 is a schematic diagram illustrating an operation of verifying software.

With reference to FIG. 4, despite the untrusted controller 40's hardware and software and its user 12 being untrusted, the frequent communication between the untrusted controller 40 and the trusted sources 210, 211 and repositories 110, 111, and the expectation that it will perform the above-described actions (see paragraph [0023]), greatly restrict the untrusted controller 40's ability, even with the collusion of a dishonest minority of sources 210, 211 or repositories 110, 111, to generate a falsified recording that will be still be accepted as valid when submitted to verification by the verifier program 300. Here, a falsified recording refers to a recording that is not recorded at the purported time, or includes falsified objects or actions, or is assembled by adapting prerecorded material to the unpredictable effects of the affecter subsystem 30, 50.

As shown in FIG. 4, the verifier program 300, when run or executed on a trusted computing device, accesses an untrusted recording file with auxiliary session information made during the recording process, which may be stored on removable media, such as a universal serial bus (USB) stick, establishes secure connections with the repositories 100 or repositories 110, 111 used during the recording, verifies consistency of the recording file with the source signals and hashed digests retained by the repositories, or, in cases of disagreement among the repositories with a majority of them, and verifies consistency within each source's 210, 211 sequence of source signals, as recorded by the majority of repositories 110, 111, between that source's 210, 211 random data strings and its previous commitments to them. The verifier program 300 further calculates and displays elapsed times between source signals and the repositories' receiving of digests influenced by them and displays the recording for viewing at full speed and in a frame-by-frame manner so as to allow a human viewer to check for evidence of hasty or automated falsification, such as jumpy video or audio or unrealistic video rendering.

Figure 5:
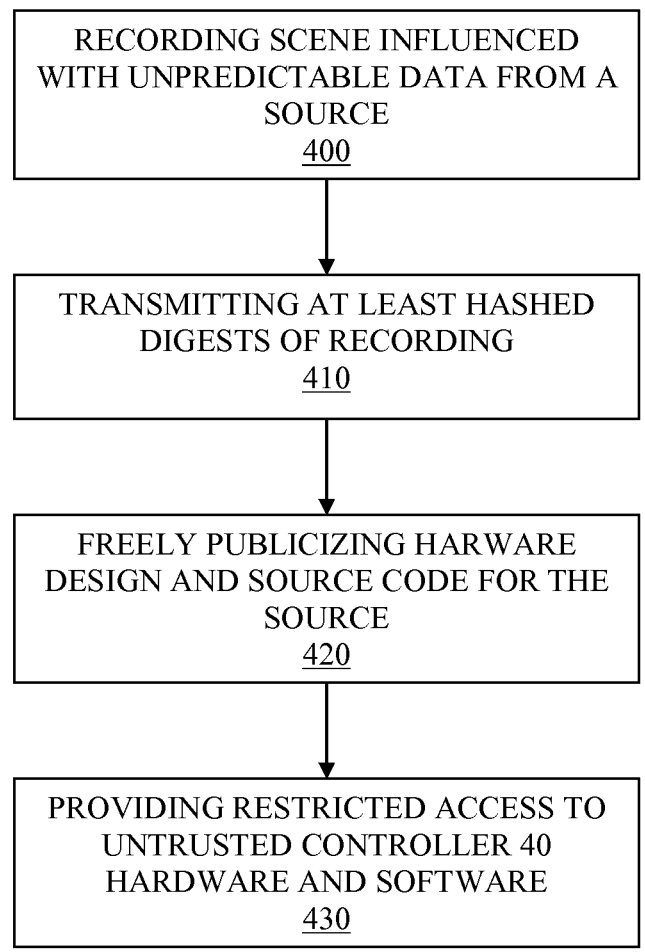
FIG. 5 is a flow diagram illustrating a method of managing recorded information.

In accordance with further aspects of the invention and, with reference to FIG. 5, a method of managing recorded information is provided and includes recording, at an untrusted controller, a scene influenced by the recorder with unpredictable data received from a single trusted source or one or more somewhat trusted sources 400, transmitting at least hashed digests of the recording from the untrusted controller to a single trusted repository or one or more somewhat trusted repositories 410, freely publicizing hardware design and source code for the single trusted source, the one or more somewhat trusted repositories, the single trusted repository and/or the one or more somewhat trusted repositories 420 and providing restricted access to client subsystem hardware and software information relating to the untrusted controller 430.

Because time-bracketed authentication depends on trusted components, in particular the single trusted source, the one or more somewhat trusted sources, the single trusted repository and/or the one or more somewhat trusted repositories and the verifier program 300, it is important that these be operated in a way that keeps them administratively and financially independent from the untrusted controller 40 or other similarly untrusted clients and their user 12. Accordingly, as mentioned above, the hardware design (e.g. physical random number generators) and software source code for the repositories 110, 111, sources 210, 211 and the verifier program 300 are made freely available to the public without cost or obligation while the untrusted controller 40 subsystem hardware and software is protected by more restrictive licenses and their use allowed only upon payment of a purchase or rental fee.

One or more administratively independent self-organized entities (SOEs) provides maintenance for the source and repository software and hardware designs, provides source and repository services to the public, and maintains and serves trusted copies of the verifier program software. The SOEs may provide their services pro bono by defraying costs through donations and advertising or by charging users of the time bracketed authentication system a fee for their services, this fee being separate and independent from any fees the users may be paying to the owner or licensor of the time-bracketed authentication system as a whole. The source signals may be broadcast or made available on the Internet without charge and the verifier program software may be made available for download without charge, but a charge is collected by the SOEs for performing the repository function, that is for receiving and storing session ID data, source signals, and hashed digests from the untrusted controller 40 during a recording and/or for subsequently verifying or serving this stored data when requested to by the verifier program 300.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are exemplary. There may be many variations possible without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A wearable video recording system with time-bracketed authentication, comprising:
    an article, including a spine, wearable by a user;
    a recording device, supported on the spine, to generate a recording of a scene;
    an affecter subsystem, supported on the spine, to influence the scene being recorded with unpredictable data; and
    an untrusted controller coupled to the recording device and the affecter subsystem, the untrusted controller being receptive of the unpredictable data, which the untrusted controller communicates to the affecter subsystem, and being configured to transmit at least hashed digests of the recording to one or more repositories,
    wherein the recording device comprises a camera comprising an optical filter, the camera being supported on the spine, and
    wherein the affecter subsystem comprises an illuminator supported on the spine at a different location from the camera to provide a parallax sight onto the scene.

2. The wearable video recording system according to claim 1, wherein the spine comprises a headband.

3. The wearable video recording system according to claim 1, wherein the spine comprises headgear.

4. The wearable video recording system according to claim 1, wherein a source of the unpredictable data and a repository are co-located.

5. The wearable video recording system according to claim 1, wherein the untrusted controller is receptive of one stream of the unpredictable data from a single trusted challenge source.

6. The wearable video recording system according to claim 5, wherein the single trusted challenge source comprises a trusted hardware subsystem configured to:
 generate the unpredictable data, and
 interface with the untrusted controller.

7. The wearable video recording system according to claim 1, wherein the untrusted controller is receptive of more than one stream of unpredictable data from two or more somewhat trusted sources.

8. The wearable video recording system according to claim 7, wherein each somewhat trusted source comprises a geographically and administratively separate computing server that generates and stores a sequence of random data values and publicizes the random data values by broadcast or client service.

9. The wearable video recording system according to claim 7, wherein each somewhat trusted source publicizes:
 identifying information,
 a time-stamp,
 a random stream of data and optionally a commitment thereto, and
 authenticating information.

10. The wearable video recording system according to claim 1, wherein the one or more repositories are configured to:
 maintain a local clock,
 receive and store a repository message, including the at least hashed digests of the recording, and
 time-stamp the repository message with a reception time thereof.

11. The wearable video recording system according to claim 1, further comprising a verifier configured to verify consistency of the recording with the at least hashed digests thereof.

12. The wearable video recording system according to claim 1, wherein the affecter subsystem comprises visible or near-infrared lasers including one or more lenses and diffraction screens.

13. The wearable video recording system according to claim 1, wherein the affecter subsystem comprises a user interface by which commands for influencing the scene and affecting the recording device, which are generated in accordance with the unpredictable data, are presented to the user.

14. The wearable video recording system according to claim 1, wherein the untrusted controller comprises a mobile power source.

15. The wearable video recording system according to claim 1, wherein a link between the untrusted controller and a source of the unpredictable data is mediated over a telecommunications service.

16. A wearable video recording system with time-bracketed authentication, comprising:
 an article, including a spine, wearable by a user;
 a recording device, supported on the spine, to generate a recording of a scene;
 an affecter subsystem, supported on the spine, to influence the scene being recorded with unpredictable data; and
 an untrusted controller coupled to the recording device and the affecter subsystem,
 the untrusted controller being receptive of the unpredictable data from a single trusted source or one or more somewhat-trusted sources, which the untrusted controller communicates to the affecter subsystem, and being configured to transmit at least hashed digests of the recording to a single trusted repository or one or more somewhat-trusted repositories,
 wherein the recording device comprises a camera comprising an optical filter, the camera being supported on the spine, and
 wherein the affecter subsystem comprises an illuminator supported on the spine at a different location from the camera to provide a parallax sight onto the scene.

17. A method of managing recorded information, comprising:
 supporting a recording device and an affecter subsystem on a spine of an article, which is wearable by a user;
 recording, at an untrusted controller via the recording device, a scene influenced by the affecter subsystem with unpredictable data received from a single trusted source or one or more somewhat trusted sources;
 transmitting at least hashed digests of the recording from the untrusted controller to a single trusted repository or one or more somewhat trusted repositories;
 freely publicizing hardware design and source code for the single trusted source, the one or more somewhat trusted sources, the single trusted repository and/or the one or more somewhat trusted repositories; and
 providing restricted access to client subsystem hardware and software information relating to the untrusted controller,
 wherein the recording device comprises a camera comprising an optical filter, the camera being supported on the spine, and
 wherein the affecter subsystem comprises an illuminator supported on the spine at a different location from the camera to provide a parallax sight onto the scene.

18. The method according to claim 17, wherein the hardware design and source code for the single trusted source, the one or more somewhat trusted sources, the single trusted repository and/or the one or more somewhat trusted repositories comprises a description of a physical random number generator thereof.

* * * * *